United States Patent
Eiermann

(12) United States Patent     (10) Patent No.: US 8,602,062 B2
Eiermann     (45) Date of Patent: Dec. 10, 2013

(54) COMPACT REED VALVE

(76) Inventor: Robert Asher Eiermann, Ashland, MA (US)

( * ) Notice: Subject to any disclaimer, the term of this patent is extended or adjusted under 35 U.S.C. 154(b) by 142 days.

(21) Appl. No.: 13/134,582

(22) Filed: Jun. 11, 2011

(65) Prior Publication Data

US 2012/0313024 A1     Dec. 13, 2012

(51) Int. Cl.
    *F16K 15/14*     (2006.01)

(52) U.S. Cl.
    USPC ............ 137/859; 137/855; 137/512.4

(58) Field of Classification Search
    USPC .......... 137/512.15, 512.4, 852, 855, 859
    See application file for complete search history.

(56) References Cited

U.S. PATENT DOCUMENTS

| | | | |
|---|---|---|---|
| 4,045,009 A * | 8/1977 | Pees | ........................... 267/139 |
| 5,421,368 A | 6/1995 | Maalouf | |
| 5,636,658 A | 6/1997 | Powell | |
| 5,672,053 A | 9/1997 | Sabha | |
| 5,884,665 A | 3/1999 | Thurston | |
| 6,116,866 A | 9/2000 | Tomita | |
| 6,823,891 B2 | 11/2004 | Schulze | |
| 7,654,283 B2 * | 2/2010 | Seto et al. | ................ 137/515.5 |
| 2006/0000459 A1 * | 1/2006 | Freeman et al. | ............ 123/574 |

* cited by examiner

*Primary Examiner* — John K Fristoe, Jr.
*Assistant Examiner* — Macade Brown

(57) ABSTRACT

Compact reeds maximize flexural length by efficiently utilizing available space surrounding the port. Maximum length arms are disposed at the perimeter of the housing inlet port. Stresses at the ends of the arms are mitigated by utilizing compound radius transitions. The transitions are constructed by two or more arcs of different radii, which produce lower stresses at such junctures than if single radius transitions were used. The arms are disposed close to the reed sealing surface edge to orient the flow streamlines to be aligned with the arm width, thereby minimizing frontal drag area. The reduced frontal area reduces drag forces and related stresses on the arms, and reduces the overall flow related pressure drop across the reed.
Replacing a single hole port, a port comprised of multiple passages of varying size control the velocity exiting the passages. The velocity gradient across the port provides further capability to orient the said streamlines to reduce said drag. In the reverse direction, where the reed obstructs flow, the ends of the passage walls provide structural support to the reed sealing surface, enabling the said surface to be thinner than otherwise possible.

4 Claims, 3 Drawing Sheets

COMPACT REED VALVE

CROSS REFERENCE TO RELATED APPLICATIONS

Not Applicable

FEDERALLY SPONSORED RESEARCH AND DEVELOPMENT

Not Applicable

REFERENCE TO COMPUTER PROGRAM

Not Applicable

BACKGROUND OF THE INVENTION

1. Field of the Invention

Figure 1:
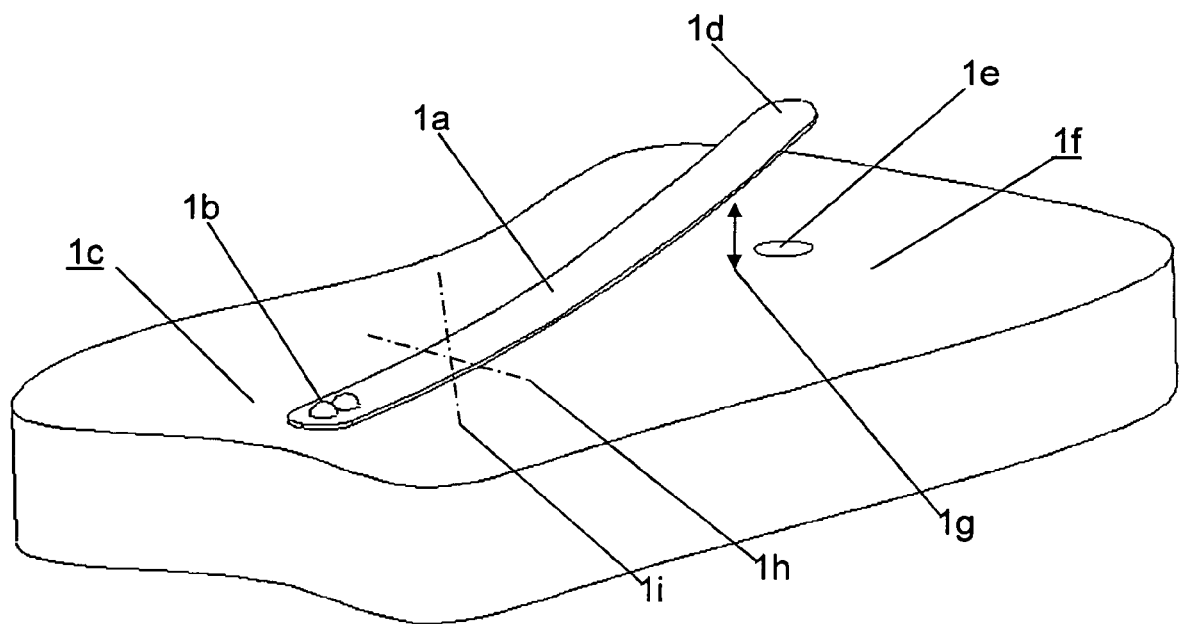

This invention relates to the design of reed valves.

2. Background of the Invention

A reed valve consists of a reed $1a$ (FIG. 1), generally designed to be a long slender cantilever made from metal or plastic, flat and rectangular in shape. The fixed end $1b$ of the flat face is attached to a stationary surface $1c$, whereas the opposite free end $1d$ is free to deflect, primarily about the thinner cross-sectional axis $1h$ of the reed. The free end of the reed covers a port $1e$ also located also on a stationary surface, hereby referred to as a ported surface $1f$. The deflection is caused by fluid flowing perpendicular to the flat face of the reed's free end. Where fluid flows through the port upward and away from the ported surface, the flow encountering the reed deflects the reed away from the ported surface, providing an opening $1g$ for continued free flow of fluid, and is referred to the permitted flow condition. Whereas, for fluid flowing reversely downwards towards the ported surface, and through the port, the reed is deflected towards the ported surface, causing contact with the ported surface, thereby covering the port, and blocking further flow of fluid. The reverse flow direction is referred to as the unpermitted flow direction. Therefore, fluid flow is permitted in one direction, and prevented in the opposite direction.

Reed valves function similarly to check valves, but are much lighter, and much more flexible. The lighter, more flexible reed requires less fluid force to deflect, and therefore provide distinct advantages over check valves. Because of these lower forces, reed valves actuate with lower differential pressures, flow rates, and for fluids with lower mass densities. Reed valves also provide advantages over check valves related to maintaining alignment of the reed free end relative to the port. While the reed is relatively free to bend about its minor axis $1h$, flexure is prevented laterally due to bending rigidity about its major axis $1i$. Additional alignment features such as sliding guides $2a$ (FIG. 2) required for check valves are not required, thereby eliminating additional friction or binding forces that can inhibit the motion of the check valve plunger $2b$. Less inhibited motion of the reed valve allows the reed valve to operate more consistently at lower pressures, flow rates, and fluid densities than check valves.

The major disadvantages of reed valves are, because of the lightness and flexibility, the reed must be long and slender. As such, the overall envelope of the reed valve is generally much larger than that of a check valve. For applications inline with piping systems, reeds require relatively large and complicated housings, and may be more susceptible to leakage, and may impractical in application due to the relatively large size. Additionally, reed valves do not contain higher pressures, due to the thin, slender section required for flexibility.

The proposed art is a compact reed $3a$ (FIG. 3) that is thin and flexible as the existing art, but is more compact in overall envelope, and therefore able to fit within the cross sectional envelope of adjoining piping. The compactness of the proposed art allows for larger porting and sealing surfaces within smaller housings, and therefore offers more opportunities for practical application. The proposed art achieves these advantages by utilizing maximum length arms $3b$ which maximize the flexural length $3c$ within the limitation of the port and respective piping diameter envelope. In addition to maximizing flexibility by maximizing length, the arm length extension creates an offset $3m$ between the end of the arms and the center of the reed sealing surface $3g$. The offset $3m$ permits further flexure of the arms and the reed sealing surface, thereby increasing the overall reed flexibility. The thickness $3d$ of the thinner minor flexural axis further maximizes flexibility. The thickness may be the same as the remainder of the reed to simplify manufacturing of the reed by machining, cutting, or etching processes, or may be different to achieve other design goals.

The high flexibility of the arms also reduces stresses resulting from deflection of the reed arms. Such stresses, particularly at junctions $3e$ from the arm to the fixed base $3i$ and from the arm to the reed sealing surface $3g$, otherwise could be high. In applications where a high number of deflection cycles are anticipated, higher stresses could result in fatigue fracture of the reed arm. The stresses may be further reduced at the said junctions by utilizing compound radius transitions, also considered part of junctions $3e$. A large radius $5a$ (FIG. 5) widens the arm $3b$, distributing stresses over a wider surface. A smaller radius $5b$ further transitions the arm geometry in the larger area of adjoining structure, controlling any stress concentrations. Both the flexible arms and the compound radii transitions minimize stresses, allowing for longer life in high cycle environments.

The arm thickness $3d$, width $3f$, and location near the reed sealing surface edge $3h$ offers less restriction to flow than would other designs where the arms were thicker, wider, or placed farther away from the sealing surface edge $3h$. Smaller overall dimensions of the reed arms provide less drag area and more remaining area in the compact space for fluid to flow. Furthermore, the arms are placed close to the sealing edge to take advantage of direction of the flow streamlines exiting the plane of the sealing surface. Close to the reed sealing surface edge $3h$, the streamlines $4a$ (FIG. 4) run parallel to the reed sealing surface $3g$. As such, alignment of the width $3f$ of arm $3b$ with the flow streamlines $4a$ is least restrictive to flow. Aligned with the flow streamline $4a$, the projected area of the arm on the flow is minimized, maintaining a larger remaining passageway for flow. Furthermore, the orientation of the arm width provides structural rigidity and strength of the valve to resist any inadvertent drag forces. Conversely, flow streamlines near port $4d$ or close to the housing wall $4e$ are oriented perpendicularly to the arm $3b$ width. As such, less area would be available for free flow, drag forces on the arms would be higher due to the higher frontal area, and drag related bending about the arm $3b$ weaker minor axis would produce higher stresses, and lower fatigue life.

To allow for a thin reed to resist high pressures under reverse flow conditions, a grated seat $3j$ (FIG. 3) is used in lieu of a single hole port. The grated seat supports the reed sealing surface span against pressure forces in the unpermitted flow direction. The grating contains a plurality of holes $3k$ (FIG. 3), which maximizes flow area in the permitted flow direction, while providing structural support via material remaining between holes 3k, referred to as grating 3l, to resist pressure forces in the unpermitted flow direction. Furthermore, the holes 3k need not be equal in diameter or spacing. The size and spacing may be different in order to adjust the velocity and direction of the streamlines 4a encountering the arms. For instance, the flow streamlines incident on the arms may be adjusted to be more parallel to the sealing surface 3g by reducing the hole 3k diameters on the outer perimeter of the hole pattern, and enlarging the hole 3k at the center of the pattern. Enlarging the center hole would promote higher fluid velocity in the center of the port 4d opening, whereas reducing the hole size at the outer perimeter would inhibit flow velocities at the port 4d periphery. The velocity gradient would therefore bend the streamline 4a more into alignment with the arm width 3f.

A reed 3a assembled with a grated reed seat 3j defines a reed valve assembly.

The novelty of the proposed art is advantageous for liquid fluids as well as gas fluids. Operation in liquid applications provides for more sensitive actuation of the valve. The grated design allows exposure to higher pressure forces that typically are associated with liquid applications. The proposed art has fewer parts, as the spring, alignment mechanism, and sealing surface may be integrated into one part. As such, the more complicated multiple part check valve construction typically associated with fluidic service is replaced with a simpler, more reliable, and more cost effective integrated part.

3. Objects and Advantages

The objects and advantages of the proposed invention are:
a) A reed valve that is thin and flexible as the prior art, but is able to fit within the envelope of adjoining piping, allowing for smaller housings,
b) Through the design of the flexural element junctions, able to minimize stresses related to deflection, thereby improving fatigue life,
c) A simple design manufacturable by machining, cutting, or etching processes,
d) The ability to consolidate multiple parts found in similarly compact check valves, such as springs, alignment features, and sealing surfaces, into one part,
e) Small flexural element cross-sectional dimensions that offer low restriction to flow, and also by orientation of the flexural element cross-sectional minor and major dimensions within the flow streamline, maximizes remaining area available for fluid flow
f) Orientation of the said minor and major dimensions to provide strength needed to structurally support the element from any inadvertent fluidic drag forces,
g) Support of the sealing surface by a grated seat against the pressure forces in the unpermitted flow direction, and
h) The size and location of specific passages in the grated seat to promote or inhibit fluid flow in specific locations in the port area, which affect the direction and velocity of resulting streamlines, particularly in the area of the flexible arms.

Further objects and advantages of the design will become apparent from a consideration of the drawings and ensuing description.

BRIEF SUMMARY OF THE INVENTION

The proposed invention combines the flexibility and lightness of current art reed valves with the compact size of current art check valves by utilizing maximum length arms, which act as the spring and alignment features for the sealing surface. The proposed art integrates these features, including the sealing surface, into one part, as do reed valves, but are difficult to achieve in compact check valve envelopes. The key features of the design, maximum length arms, provide both spring return and alignment of the sealing surface within a compact envelope. The cross-sectional dimensions of the arms are minimized to lower resistance to flow, but equally important, the arms are located near the sealing surface to orient the thin axis of the arm to be parallel to the flow streamline. Aligning the thin axis of the arms with the flow streamlines lowers the frontal drag area encountering the flow, thereby lowering flow resistance and related drag forces on the reed arm, and also maximizes the arm strong axis bending resistance to the inadvertent drag forces. A grated seat is also provided which supports the thin sealing surface of the reed from high pressures in the unpermitted flow direction, and by sizing and spacing the individual passages, further influences the orientation of the streamlines relative to the flexible arms.

DRAWINGS

Figures

Figure 2:
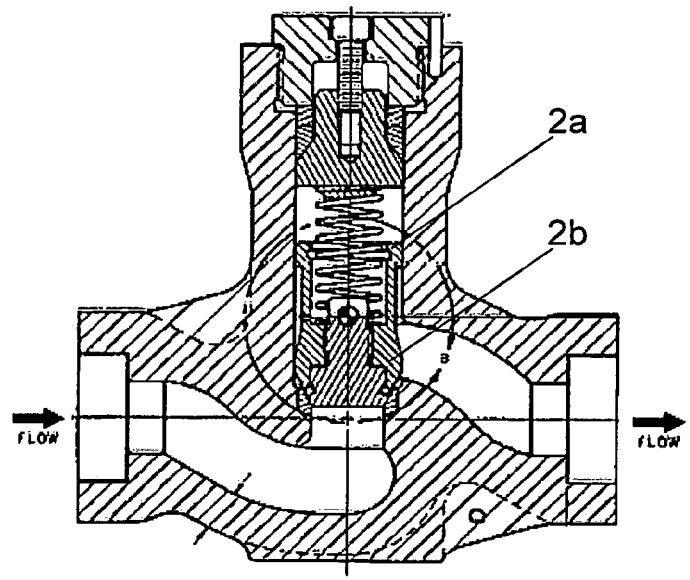
Figure 3:
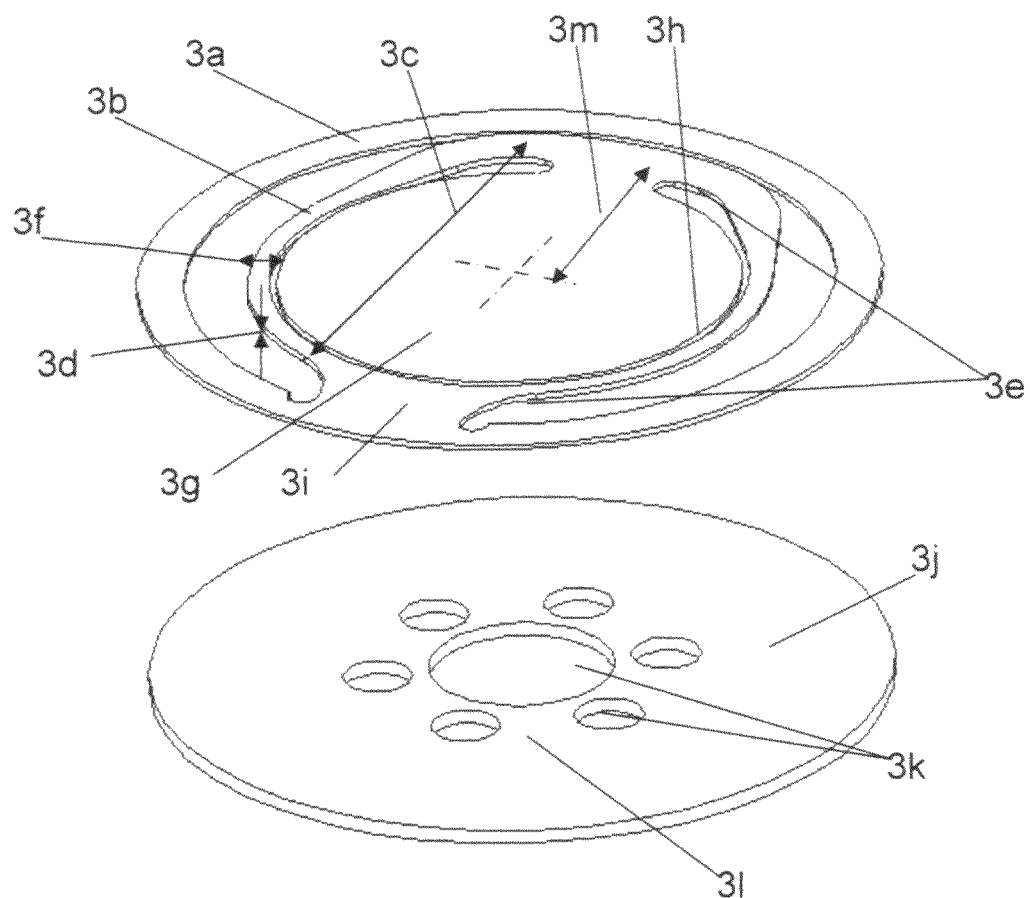
Figure 4:
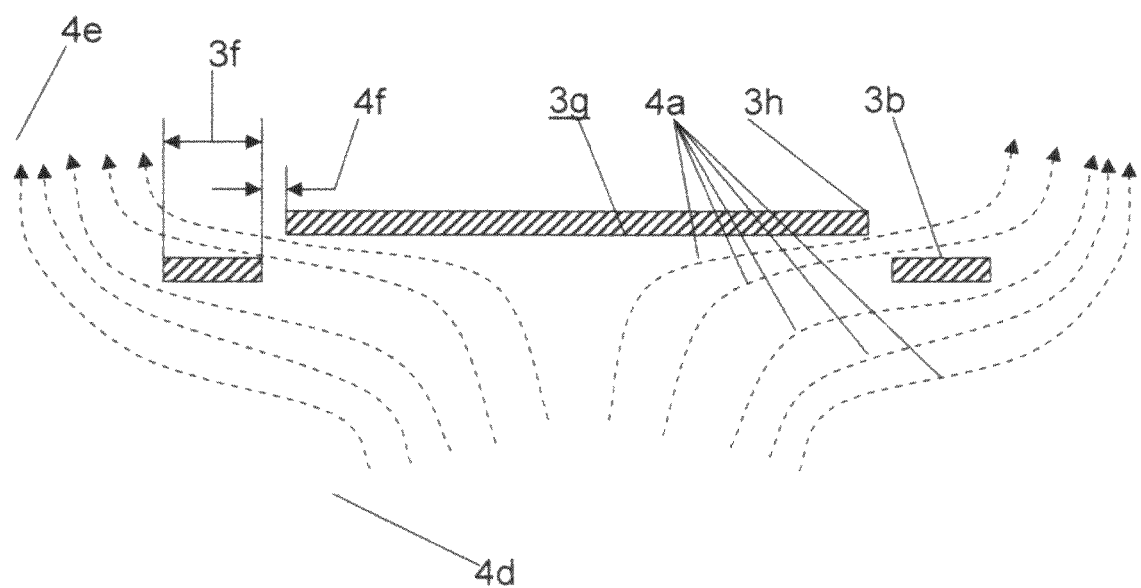
Figure 5:
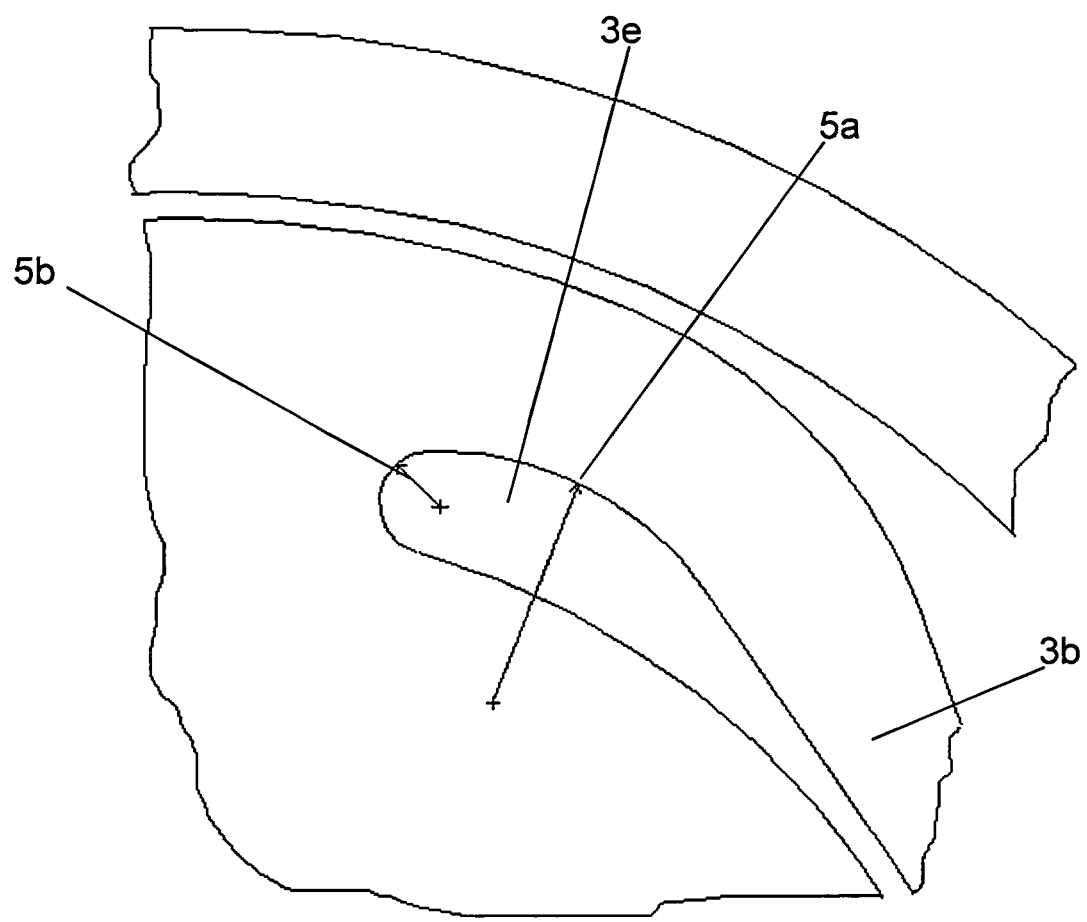

FIG. 1 General Depiction of a Reed Valve (Prior Art)
FIG. 2 General Depiction of a Check Valve (Prior Art)
FIG. 3 Compact Reed and Grated Seat (Proposed Art), Exploded Assembly View
FIG. 4 Description of Flow Streamlines about the Compact Reed (Proposed Art), Sectional View
FIG. 5 Compound Radius Transition (Proposed Art), Detail Plan View

DRAWINGS

Reference Item Numerals

| | | | |
|---|---|---|---|
| 1a | Reed (Prior Art) | 1b | Reed Fixed End (Prior Art) |
| 1c | Stationary Surface (Prior Art) | 1d | Reed Free End (Prior Art) |
| 1e | Port (Prior Art) | 1f | Ported Surface (Prior Art) |
| 1g | Opening for Fluid Flow | 1h | Reed Minor Axis |
| 1i | Reed Major Axis | 2a | Check Valve Sliding Guide (Prior Art) |
| 2b | Check Valve Plunger (Prior Art) | 3a | Compact Reed (Proposed Art) |
| 3b | Maximum Length Arm (Proposed Art) | 3c | Arm Flexural Length |
| 3d | Arm Minor Thickness | 3e | Compound Radius Junction (Proposed Art) |
| 3f | Arm Width | 3g | Reed Sealing Surface |
| 3h | Reed Sealing Surface Edge | 3i | Arm Fixed Base |
| 3j | Grated Seat (Proposed Art) | 3k | Grated Seat Hole (Proposed Art) |
| 3l | Reed Seat Grating (Proposed Art) | 3m | Offset of Arm Connection to Reed Sealing Surface (Proposed Art) |
| 4a | Flow Streamline | 4d | Reed Port |
| 4e | Reed Housing Internal Wall | 4f | Close Proximity of Maximum Length Arm to Sealing Surface Edge (Proposed Art) |
| 5a | Large Radius of Compound Radius Junction (Proposed Art) | 5b | Small Radius of Compound Radius Junction (Proposed Art) |

DETAILED DESCRIPTION OF THE INVENTION

FIG. 3—Preferred Embodiment

The preferred embodiment of the invention is the maximum length arms 3b (FIG. 3) of the compact reed 3a. The arm is one or a symmetric pair, fixed at the base 3*i*, spans approximately the entire width of the sealing surface 3*g* along a trajectory approximately the same as the sealing surface edge 3*h*, and terminates at the reed sealing surface 3*g* so as to produce an offset 3*m* from the said termination to the center of the sealing surface 3*g*. The offset 3*m* produces additional flexibility above that attained by the maximum length arms alone, by permitting additional flexure of the said surface 3*g* and arm 3*b* when urged by a fluid.

The importance of the maximum length arms to the flexibility can be explained by equation 1.

$$\frac{1}{k} \propto \left(\frac{L}{t}\right)^3 \quad \text{(Equation 1)}$$

where,
1/k=Reed Flexibility
L=Length of Arm
t=Reed Thickness

The arm flexibility is increased cubically by lengthening the arm, as well as minimizing the thickness of the arm. In many applications, especially where the arm is integral with the reed sealing surface, reed pressure stresses prevent indiscriminate reduction in the thickness. Therefore, lengthening the arm becomes the predominant means to increasing flexibility. The maximum length arms allow for the increase in flexural length within the confines of a relatively small diameter of the adjoining piping.

Although the embodiment states that the reed arms follow a trajectory similar to the sealing surface edge 3*h*, the arms may follow a different trajectory, but whose length is contained within the enclosing housing. The novelty of the invention is the ability of the reed arms to be long relative to the piping inside diameter, port diameter, and respective housing cavity to achieve an overall envelope approximately within the confines of the adjoining piping cross-section.

The arms are illustrated as pairs, being symmetric about a common axis. However, the arms may or may not be symmetric. Furthermore, the arm may be singular, not a pair, and may extend around any portion of the sealing surface to maximize length and flexibility. However, extending within one revolution around the cavity is a limitation of the embodiment, so as not to duplicate the prior art of coil springs. The embodiment emphasizes the primary mode of deflection to be by flexure, and not torsion.

The arms may be made from a variety of materials, depending on the application. Metallic materials such as steel, stainless steel, copper based alloys, or nickel based alloys may be used for applications demanding higher pressure and/or temperature. Non-metallic materials such as composites, polyethylene, polypropylene, or rubber may also be used in applications where pressure and/or temperature will not debilitate the material. The arms may be integral with the reed seat, and manufactured by cutting, machining, or chemical etching. The arms may also be separate from the reed seat, and joined mechanically, or by welding or bonding.

Additional Embodiments—FIGS. 3, 4, and 5

The compound radius transition 3*e* (FIG. 3) located at transitions from the arm 3*b* to the fixed base 3*i* and from the arm 3*b* to the reed sealing surface 3*g* is an additional embodiment. The compound radius transition 3*e* contains a larger radius arc 5*a* (FIG. 5), and a smaller radius arc 5*b*. The larger radius is approximately 2 times larger than the smaller radius, whose arcs are tangent to one another, and tangent to said adjacent transitions. The larger radius is located nearest the arm 3*b* whereas the smaller radius is located nearest to the adjoining base 3*i* or sealing surface 3*g*.

Although compound radii generally consist of two radial arcs, tangent to each other, proportional by about 2:1, the compound radius transition may consist of more than two arcs of different radii, may or may not be tangent to one another or adjoining transitions, and may be proportional by other ratios than 2:1. Such features of the compound radii may be adjusted to produce the lowest possible stresses in areas of geometric transition, and stress concentration.

The close proximity 4*f* (FIG. 4) of the arm 3*b* to the sealing surface edge 3*h* is an additional embodiment. The close proximity 4*f* aligns the width 3*f* of the arm 3*b* parallel to the flow streamlines 4*a*. Near the sealing surface 3*g*, the said streamlines are parallel to the sealing surface 3*g*, and therefore are also parallel to the said aligned arm width, resulting in less obstruction to flow. While reorientation of the arm minor axis relative to the flow streamlines is possible in order to facilitate flow when locating the arms in other regions, the embodiment emphasizes that orientations of streamlines are less predictable farther away from boundary conditions. Furthermore, orientation of the arms out of plane with the remainder of the valve face is more costly to manufacture.

The grated seat 3*j* (FIG. 3) is an additional embodiment. The grated seat 3*j* contains a plurality of holes 3*k* contained within the sealing surface 3*g* region which allow for minimal resistance to air flow in the permitted flow direction. Surrounding the holes is the remaining seat structure, either plastic or metallic, referred to as grating 3*l*, which supports the reed sealing surface 3*g* span from high pressures in the unpermitted flow direction. The reed sealing surface 3*g* would otherwise encounter much higher stresses if the midspan support was not present, as described in equation 2.

$$\sigma \propto p \times \left(\frac{a}{t}\right)^2 \quad \text{(Equation 2)}$$

where,
σ=Reed Sealing Surface Bending Stress due to Pressure
p=Pressure
a=Radius (½ Unsupported Span of Reed Sealing Surface)
t=Reed Sealing Surface Thickness For instance, grating whose hole span is one half the distance of the overall sealing surface would reduce the stress to one quarter of the stress without grating support.

The grating 3*l* is further embodied to minimize the thickness of the maximum length arms 3*b* in cases where the said arms are integral with the reed sealing surface. Minimizing the thickness maximizes arm flexibility, a preferred embodiment, and reduces arm flexural stresses.

The hole 3*k* size and location are an additional embodiment. Each hole 3*k* size and location in the sealing surface 3*g* region influence the overall flow gradient across the port region, and therefore influence the direction of the flow streamlines 4*a* (FIG. 4). The hole 3*k* diameter may or may not be circular, similar to each other in size, or whose location is equally spaced. The size, number, and spacing may be adjusted to accomplish any combination of structural support to the reed sealing surface 3*g*, change in flow gradient, and subsequently, orientation of flow streamline 4*a* for either flow performance or structural considerations.

Operation—Introduction to Prior Art

To understand the operation of the embodied invention, a discussion of the operation of the prior art may assist in the understanding of the more complex operation of the invention claimed. Fluid flowing through a port 1e (FIG. 1) in an upward direction impinges on the reed free end 1d sealing surface. The reed 1a is thin about the minor axis 1h, long relative to the thickness, and therefore considered slender and flexible. Based on the slenderness, corresponding flexibility, and the fluid's impingement forces due to its pressure, density, and velocity, the sealing surface 1d may deflect upward by some magnitude 1g. The port is opened to flow, and fluid flow is permitted in the upward direction. Conversely, fluid flowing in the reverse direction will impinge downward upon the opposite face of the reed sealing surface, urging the reed upon the ported surface 1f, thereby sealing the port and preventing fluid flow.

The reed and port may be in oriented differently, so as to directionally control flow in the desired direction.

Laterally, alignment of the reed free end 1d relative to the port 1e is maintained without supplemental alignment features such as guides. The major axis 1i of the reed offers rigidity. Furthermore, the fluid impingement forces on the reed are not as significant due to the low projected frontal area in the lateral direction. As such, no additional alignment features are required, and related friction and binding are eliminated as problematic failure modes.

Operation—Preferred Embodiment (FIGS. 3 and 4)

The proposed art compact reed functions similarly to the prior art, with a major advantage of smaller overall reed size for a similar corresponding port 4d (FIG. 4) size, thereby accommodating smaller housing cavities. Said slenderness and flexibility are attained by maximum length arms 3b (FIG. 3). The arms utilize to the maximum extent the available space and perimeter around the sealing surface 3g, and the port covered by the said sealing surface, to achieve greatest possible length and flexibility, as illustrated in equation 1. An offset 3m between the arm connection to the said sealing surface and the center of the said sealing surface further increases overall reed flexibility by permitting inclination of the said sealing surface, and also permitting flexure of the said sealing surface itself, when urged. Laterally, the arms provide rigidity as does the prior art for maintaining alignment of the sealing surface 3g with the said port. The reed sealing surface 3g functions identically in permitting and restricting flow as does the prior art.

Operation—Additional Embodiments (FIGS. 3, 4, and 5)

The compound radius transition 3e (FIG. 3) mitigates high stresses that otherwise could be generated in prior art junctions. Where the flexural element, the arm 3b, transitions in size to a fixed base 3i or reed sealing surface 3g, high stresses generally are encountered at the transition. To mitigate these stresses, single radii, thicker sections, or reinforcement may be added to reduce the stress levels. However, compound radii are simple and more effective in lowering concentrated stresses by gradually transitioning the flexural width 3f. A larger radius 5a (FIG. 5) is used to gradually widen the section, and disperse the stresses, whereas, a smaller radius 5b near the root of the transition may absorb the less intensive stresses. The ratio of the two said radii is generally 2:1, but may be different, and may include more than two radii.

Close proximity 4f (FIG. 4) of the arm 3b to the sealing surface edge 3h aligns the width 3f of the arm 3b in the streamline 4a. Prior art generally limits reed deflection in the area of the sealing surface by way of a stationary surface, and does not generally encounter high flow rates in other unsupported flexural areas of the reed due to the large size, and remoteness from the port. The compact reed will incur higher flow rates around the arm 3b where the arm is susceptible to unsupported flexure. Such flow in the arm regions may produce undesired drag, flow resistance, and arm stresses. To minimize drag related effects, the arm is located near the sealing surface edge 3h to take advantage of streamlines 4a aligned with the sealing surface 3g flat boundary. Near the said edge, the flow streamline 4a will be aligned with the surface 3g, and therefore aligned with the adjacent arm 3b width 3f. Such alignment will reduce arm frontal area incident to the flow, and subsequent drag forces, and furthermore reduces bending stresses by orientation along the stronger axis of the arm section.

The grated reed seat 3j (FIG. 3) provides approximately the same flow area as a single hole port of the same overall envelope by employing a plurality of smaller holes 3k contained within the region of the sealing surface 3g. The holes are placed such that seat material remains between the holes, referred to as a grating 3l. The grating supports the relatively thin reed, reducing the unsupported span, thereby reducing stresses due to pressure in the unpermitted flow condition, as demonstrated in equation 2. The holes 3k need not be equal in size or spacing in order to adjust the nature of the flow impinging on the reed, and the direction and velocity of streamlines 4a (FIG. 4) encountering the arms. For instance, the flow streamlines 4a incident on the arms 3b may be adjusted to be more parallel to the sealing surface 3g by reducing the hole 3k (FIG. 3) sizes on the outer perimeter of the hole pattern, and enlarging the hole 3k at the center of the pattern. Enlarging the center hole would promote higher fluid velocity in the center, whereas reducing the hole size at the outer perimeter would inhibit flow velocities at the sealing surface 3g periphery. The velocity gradient would therefore bend the streamline 4a more before impinging upon the sealing surface 3g, thereby adjusting the alignment of the streamline 4a relative to the arm width 3f.

Conclusion, Ramifications, and Scope

The proposed invention permits the use of reed valves in a wider range of applications. Such a design creates distinct and unique advantages:

a) A smaller, more compact, lighter reed valve assembly that may fit in smaller spaces, or in-line with smaller piping systems.

b) A more robust reed which sustains higher fluid pressures, velocities, and densities.

c) Although smaller and more robust, reed flexibility and lightness, and performance benefiting from said flexibility and lightness, which are maintained to that of prior art reed valves through the use of flexible arms which maximize their length within the confines of the smaller attainable housing.

d) Furthermore, ability to maintain critical part alignment without additional alignment features in comparably small prior art check valves.

e) Consolidation of multiple parts, such as sealing surfaces and return springs, into one part readily manufacturable by chemical etching, machining, or cutting.

f) As such, broadening the range of applications for reed valves from prior art reed and check valves.

Although the description above contains much specificity, these should not be construed as limiting in scope of the invention, but merely providing illustrations of some of the presently preferred and additional embodiments of this invention. For example, the benefits of the proposed invention are not limited to housed assemblies attached to in-line piping systems, but may be more integral with fluidic circuits. The compact reed and grated reed seat may be installed in manifolds, internal to existing piping, or within the connection of two piping joints, threaded, welded, or brazed, without the use of a specially designed housing. The valve may be applied as a check valve, intake or exhaust valve for reciprocating pumps and gas compressors, or any other application requiring directional flow control. The fluids passing through the valve may be liquid or gas. The valve may be applied to medical applications as well as mechanical applications. The materials employed in the reed and reed seat may be metallic, plastic, wood, or composite. The sealing surface may not be in contact with the port when fluid is not impinging on or pressurizing the sealing surface. Fluid impingement or pressure may urge the sealing surface in contact with a ported surface, thereby preventing further flow in the fluid direction.

The flexible arms are illustrated as pairs, being symmetric about a common axis. However, the arms may or may not be symmetric. Furthermore, the arm may be singular, not plural, and may extend around any portion of the internal cavity to maximize length and flexibility. However, extending within one revolution around the cavity is a limitation of the embodiment, so as not to duplicate the prior art of coil springs. The offset between the end of the arms and the center of the sealing surface may or may not further incline the reed sealing surface so as to produce additional flexibility.

The reed valve assembly is defined as the compact reed assembled with a grated seat. However, the novelty applies also to a compact reed assembled with a prior art single hole port. The compact reed is advantageous without the added benefit of a grated reed seat.

To further distinguish the invention from prior art, the scope of the invention does not pertain to swing check valves, or directional control valves which utilize rotating hinges as a primary mechanism for movement of the sealing surface. The said hinges may or may not include springs which assist in returning the sealing surface to a predisposed position. Although the said sealing surface may displace in a similar trajectory to that of the proposed art, the proposed art is distinguished from the said hinge in that the proposed art displacement is by flexure of a single part, the flexible arm, and not by torsion of a single part such as a coil spring, and not via rotation of two separate parts connected by a pin, axle, or other rotary joint.

Thus the scope of the invention should be determined by the appended claims and their legal equivalents, rather than by the examples given.

The invention claimed is:

1. An elastic arm fixed at one end and attached to a flexible cover at an opposed end, whereby the said cover is about congruent with and contiguously overlaps a port which discharges fluid, such that a device comprised of the said elastic arm, said cover, and said port are substantially similar to a check valve, whereby the edge of the said elastic arm substantially surrounds the outer edge of the said cover, and is adjacent and close to the said outer edge but does not overlap the said cover, whereby the surface of the said elastic arm is about planar with the surface of the said cover, whereby the said opposed end attachment is offset from the center of the said cover, thereby when the said cover is urged in a direction about perpendicular to the said cover surface, the said cover urge superimposes with an elastic arm urge, whereby the said port is comprised of a plurality of passages predetermined in flow area and location, such that the velocities of the said fluid traversing from the said passages to the said cover are predetermined, thereby the direction of the said fluid traversing efferent from the said cover center to the said cover edge are about parallel with the said elastic arm surface, thereby fluid drag urged upon the said elastic arm is about zero; wherein a symmetrically opposed and substantially similar elastic arm is disposed in the plane of the said cover surface, whereby the lengths of the said elastic arms are about the width of the said cover, and do not overlap each other or the said cover, whereby the said symmetrically opposed elastic arm is also fixed at one end and attached to the said cover at the opposed end, thereby an acclivity of the said cover surface about an intersecting axis of a plane of said symmetry and the plane of the said cover surface is about zero when urged in the said perpendicular direction relative to the said acclivity when not urged.

2. The elastic arm of claim 1 wherein the said elastic arm and said cover are about rigid in any direction parallel to the said cover surface, such that the displacement of the said cover in the said parallel direction when urged in the said perpendicular direction is about zero relative to the disposed location when not urged.

3. The elastic arm of claim 1 wherein the said ends are comprised of a corner, whereby the said corner is comprised of a plurality of predetermined radii, thereby the stresses in the said corners are about zero.

4. The elastic arm of claim 1 wherein the distance of the said elastic arm edge to the said cover edge is predetermined, such that the said fluid traversing from the said port to the said cover thereby traverses the surface of the said cover in a direction about efferent with the said cover and parallel with the said cover surface, whereby the said cover surface is about parallel with the said elastic arm surface, thereby the direction of the said fluid traversing close to the said cover edge is also about parallel with the said elastic arm surface, thereby fluid drag urged upon the said elastic arm is about zero.

\* \* \* \* \*